June 12, 1973  J. P. WHELAN  3,738,889
METHOD OF MAKING A DISPOSABLE FILTERING DEVICE
Original Filed Oct. 11, 1967  5 Sheets-Sheet 1
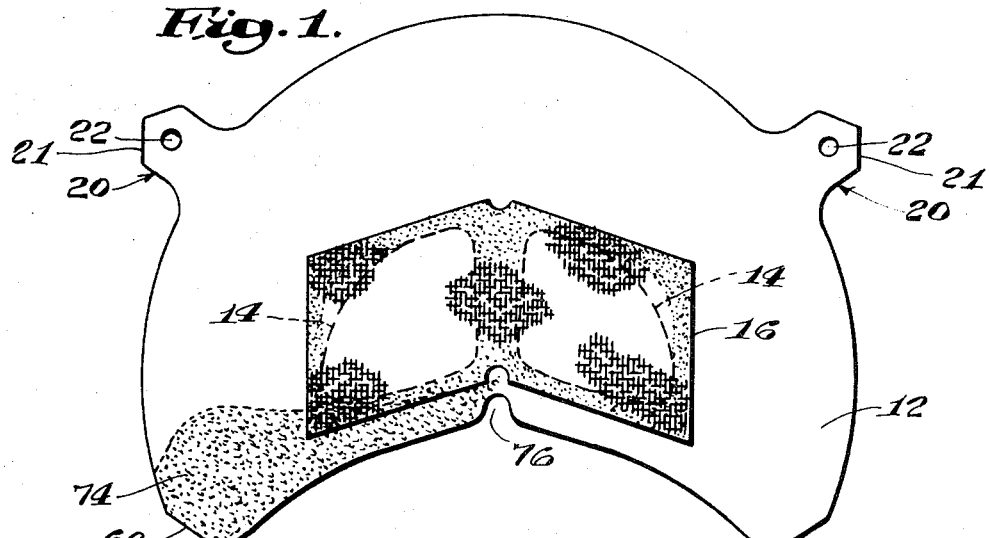
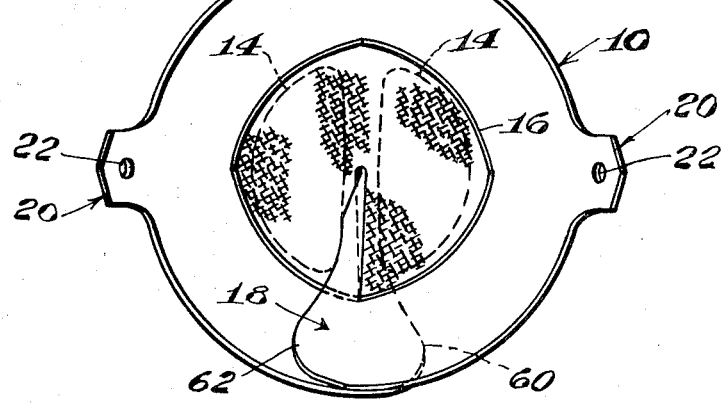
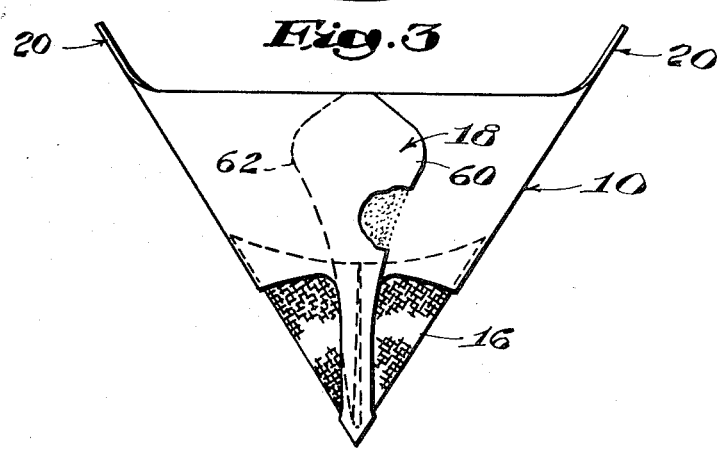
Inventor:
James P. Whelan,
by Robert L. Churchill
Attorney

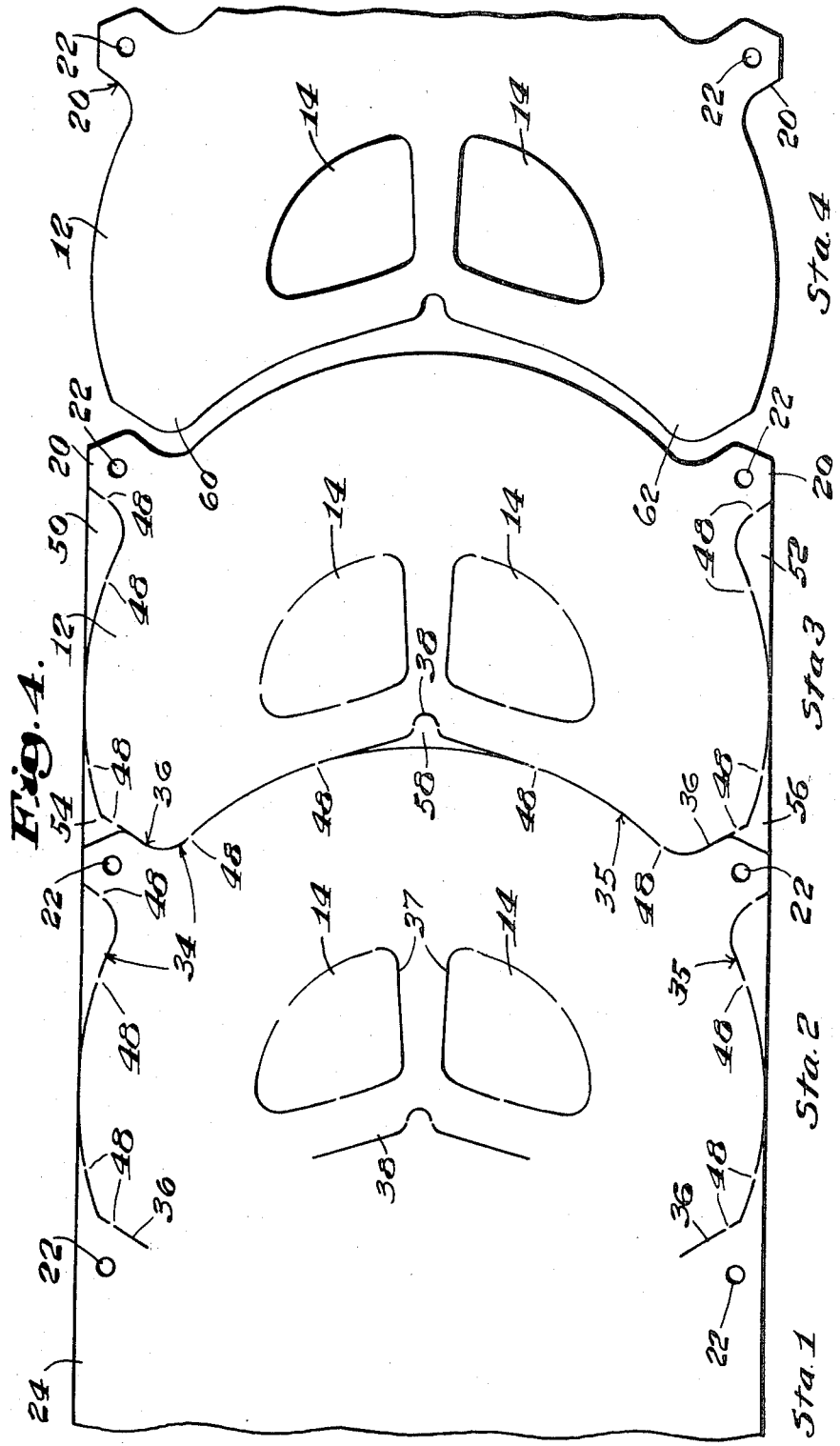

June 12, 1973 J. P. WHELAN 3,738,889
METHOD OF MAKING A DISPOSABLE FILTERING DEVICE
Original Filed Oct. 11, 1967 5 Sheets-Sheet 3
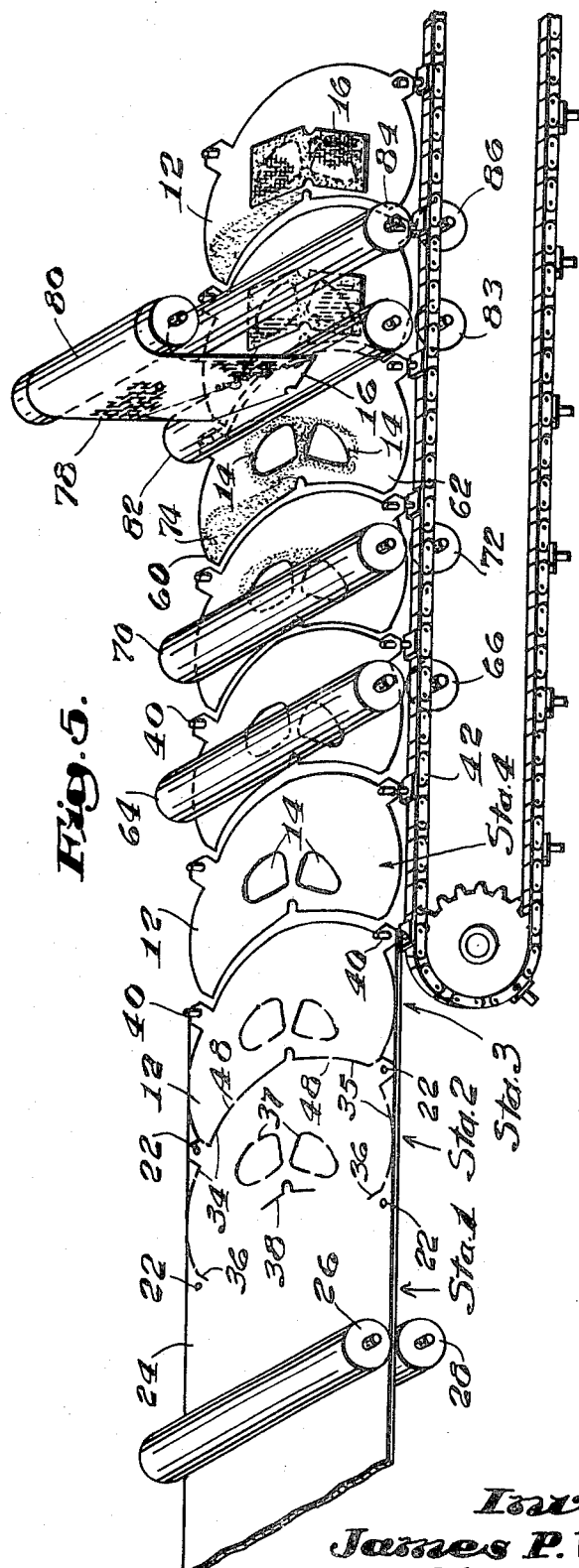

June 12, 1973     J. P. WHELAN     3,738,889
METHOD OF MAKING A DISPOSABLE FILTERING DEVICE
Original Filed Oct. 11, 1967     5 Sheets-Sheet 4
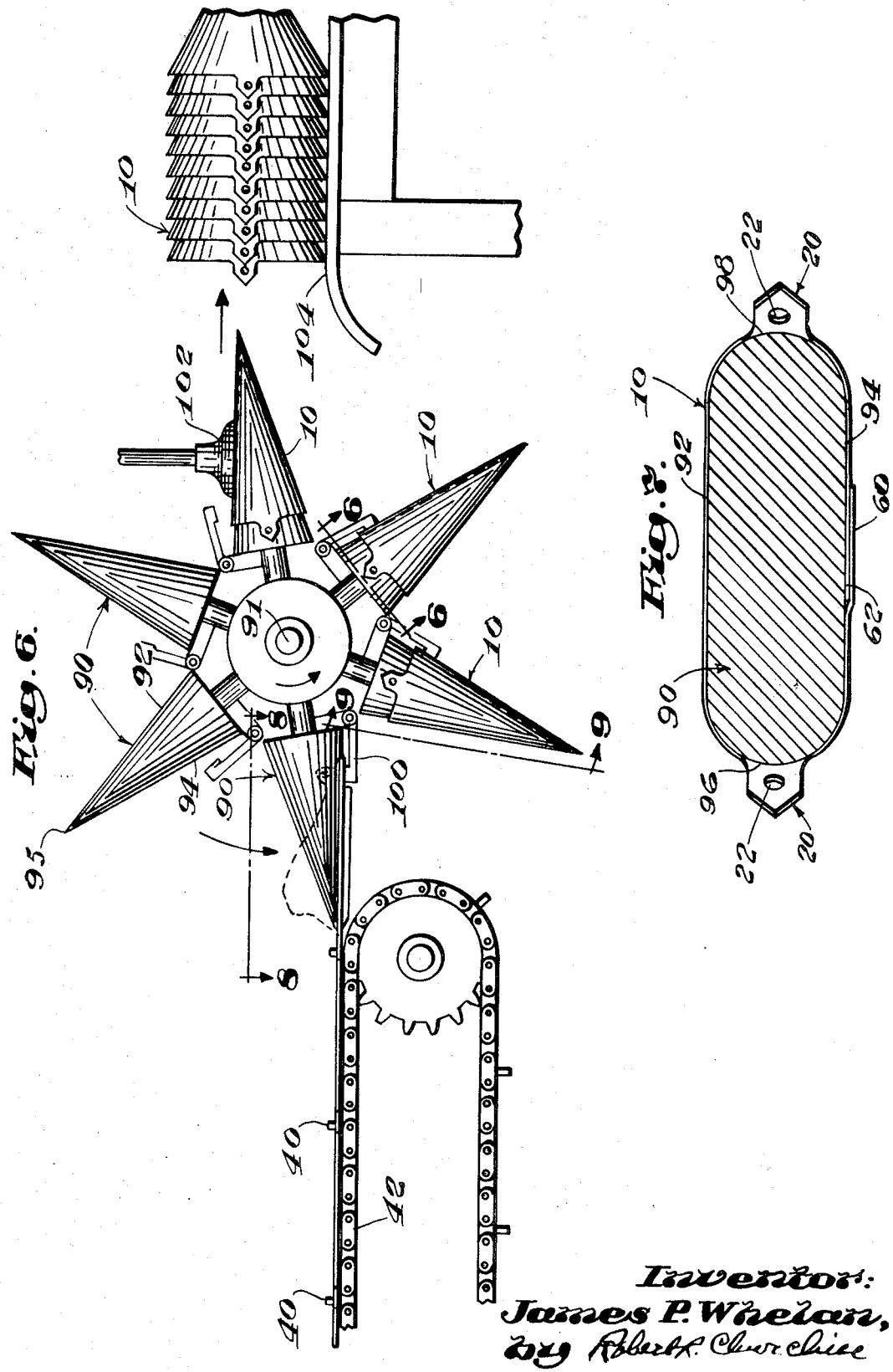
Inventor:
James P. Whelan,
by Robert S. Churchill
Attorney June 12, 1973  J. P. WHELAN  3,738,889
METHOD OF MAKING A DISPOSABLE FILTERING DEVICE
Original Filed Oct. 11, 1967  5 Sheets-Sheet 5

Inventor:
James P. Whelan,
by Robert L. Churchill
Attorney

United States Patent Office 3,738,889
Patented June 12, 1973

3,738,889
METHOD OF MAKING A DISPOSABLE FILTERING DEVICE
James P. Whelan, North Marshfield, Mass., assignor to Ad-Tec Products, Inc., North Quincy, Mass.
Original application Oct. 11, 1967, Ser. No. 674,624, now Patent No. 3,567,033. Divided and this application Mar. 1, 1971, Ser. No. 119,688
Int. Cl. B32b *31/00;* B01d *39/08*
U.S. Cl. 156—263                                         7 Claims

ABSTRACT OF THE DISCLOSURE

A disposable conical filtering device having gauze covered openings is characterized by structure providing a more rigid and efficient filtering device which is more convenient in use and which is particularly adapted for straining paint or the like. The novel method of producing the present filtering device is characterized by novel steps including die-cutting blanks from a strip of material and assembling the same in a rapid and economical manner with a minimum of waste material.

---

This application is a division of my copending application, Ser. No. 674,624, filed Oct. 11, 1967, now U.S. Pat. No. 3,567,033.

The invention has for an object to provide a novel and improved disposable filtering device characterized by rigid structure which is convenient in use and which is particularly adapted for straining paint or other liquids.

The invention has for another object to provide a novel and improved method of manufacturing a disposable conical filtering device of the character specified by which the device may be produced in a rapid and economical manner with a minimum of waste material.

With these general objects in view and such others as may hereinafter appear, the invention consists in the filtering device and in the method of making the same as hereinafter described and particularly defined in the claims at the end of this specification.

In the drawings illustrating the preferred embodiment of the invention:

FIG. 1 is a developed view of a blank from which the present filtering device is formed;

FIG. 2 is a plan view of the filtering device in assembled form;

FIG. 3 is a side elevation of the filtering device shown in FIG. 2;

FIG. 4 is a plan view diagrammatically illustrating the initial steps in the method of die-cutting and separating successive blanks in the production of the present filtering devices;

FIG. 5 is a perspective view more or less diagrammatically illustrating the various steps in the method of producing the present filtering devices;

FIG. 6 is a side elevation diagrammatically illustrating apparatus for completing the production of the present filtering devices in accordance with the present method;

FIG. 7 is a cross sectional plan view of a cone forming mandrel as seen from the line 7—7 of FIG. 6;

Figure 8:
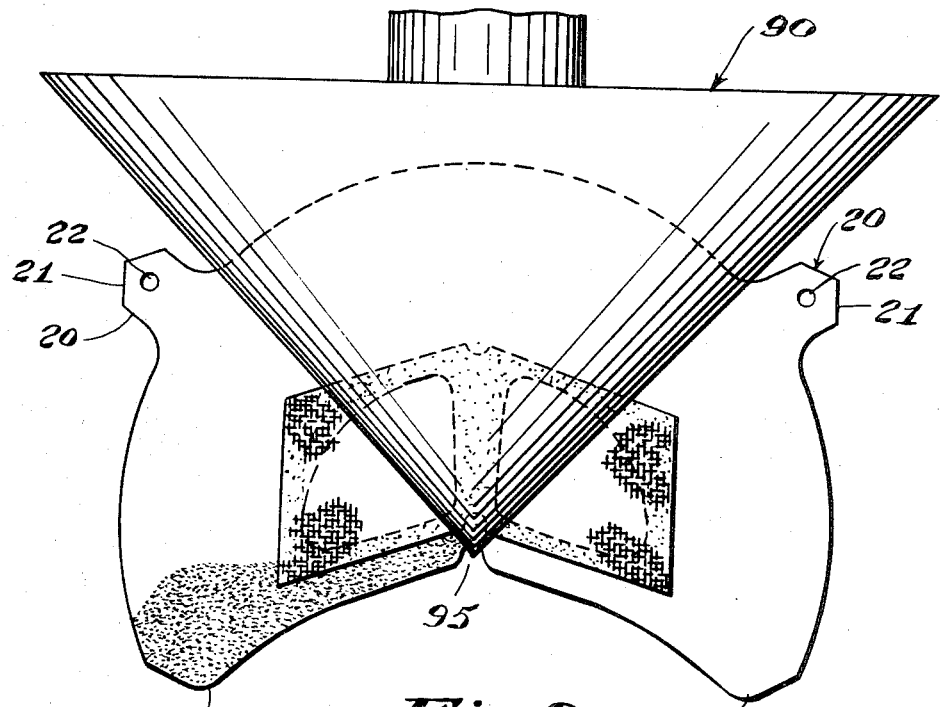
FIG. 8 is a plan view detail of a forming mandrel as seen from the line 8—8 of FIG. 6 and showing a blank about to be wrapped thereabout.

In general, the present invention contemplates a filtering device or strainer of novel and improved construction and particularly a conical strainer of the disposable type having gauze covered openings therein. The invention further contemplates a novel and improved method of making a filtering device which results in a saving of paper and cloth and which produces a more efficient and convenient filtering device.

In practice, most paints and enamels as they are manufactured and packaged in the factory are not always entirely free of foreign particles inadvertently included therein and which might cause difficulty when used in spray painting machines. For this reason, all paints deposited in such machines are first strained or filtered. Prior to the present invention, disposable conical or funnel shaped paint strainers have been available which are made of a fibrous material, such as paper, and which are provided with gauze covered openings through which the paint is strained. In the production of the conical strainers, the blanks are die-cut from a strip of heavy paper or other fibrous material; the openings are provided with a gauze covering; and the blanks are then formed into conical shape and provided with overlapping adhesively secured side seams to complete the production.

In the manufacture of prior conical paint strainers, the pattern of the died-out blank from which the cone is formed was such as to require successive patterns cut from a web of material to be spaced apart longitudinally and also spaced from the edges of the strip, such spacing representing waste material which adds considerably to the cost of manufacture. In accordance with one feature of the present invention, the pattern of the died-out blank for forming a cone is such that the trailing edge of one blank coincides with the leading edge of a succeeding blank, thus eliminating waste between successive blanks. Also, the present pattern takes up the full width of the web or strip of material from which the blank is cut, thus providing a further saving of the material. Furthermore, in the prior art the pattern of the gauze material for covering the openings through which the material is strained was such that the leading and trailing edges were spaced apart when cut from a strip of gauze, thus resulting in waste material. In accordance with the present invention, the leading and trailing edges of the gauze pattern coincide with each other and the pattern takes up the full width of the strip of gauze, thus eliminating entirely waste of gauze material in the production of the conical paint strainers.

In the use of the prior conical paint strainers, it was found that the overlapped adhesive seam was subject to attack by acrylic lacquer paints and thinners so that after use if it was picked up to dispose of the same, it would fall apart at the side seam. Such prior cones had a relatively narrow adhesively secured overlapped seam. In accordance with another feature of the present invention, the structure of the conical strainer has been improved to provide a relatively larger overlapped and adhesively secured area at the side seam, such larger overlapped area adding rigidity to the completed strainer. In addition, the larger area of the seam serves as an obstruction to prevent the acrylic lacquer or thinners from bleeding through or destroying the seam during the time the strainer is in use.

In accordance with another feature of the invention, the present conical strainer is provided with two opposed handles extended from the periphery of the upper edge of the cone. The handle extensions are relatively short and are formed integrally with the blank during the die-cutting operation. Each handle is also provided with an opening. In use, the handles may be grasped to place or remove the disposable strainer in position whereby to avoid transferring paint or the like to the fingers. The provision of the openings in the handles affords a convenient hole through which a rod may be passed for supporting and storing a plurality of conical strainers in nested relation.

The present invention further contemplates a novel method of producing the present conical paint strainers whereby a more rigid and efficient paint strainer having handles may be produced with substantial savings in paper and gauze.

Referring now to the drawings, and particularly to FIGS. 1-3, the disposable filtering device produced in accordance with the present invention is herein illustrated as comprising a conical member 10 of fibrous material, such as heavy paper. The conical member 10 is formed from a die-cut blank 12 provided with openings 14 which are covered with a filtering material, such as a coarse gauze 16 adhesively secured to the marginal edges of the openings. The conical member 10 is provided with a relatively wide overlapping adhesively secured side seam 18. The died-out blank 12 is further provided with projections 20 formed integrally with the blank and which comprise opposed handles in the assembled filter. The handles 20 are also provided with openings 22 as shown.

As diagrammatically illustrated in FIGS. 4 and 5, the steps in the method of making the present conical filtering device comprise die-cutting successive blanks 12 from a strip or web 24 of fibrous blank forming material, such as a heavy paper or the like. In operation, the web 24 is withdrawn from a supply roll thereof, not shown, and the leading end of the web is introduced between intermittently operated feed rolls 26 and 28 which are arranged to advance the web a predetermined distance each cycle of operation. In the illustrated embodiment of the invention, for example, the length of web advanced each cycle is five and three-quarters inches.

At the first station of operation, a pair of registration holes are punched along opposite marginal edges of the web which form the openings 22 in the handles 20 as shown. The registration holes may be punched by vertically reciprocable punch and die units, not shown, during the idle period of the web. The web is then advanced to the second station of operation where a vertically reciprocable steel rule cutting die, delineated by the lines 34, 35, 36, 37 and 38, is operated to partially cut the blank at station 2 during the idle time of the web and to simultaneously complete cutting of the trailing end of the preceding blank which was advanced to and is now disposed at a third station of operation. It will be observed that the trailing end of the blank at the second station of operation is uncut except at the sides 36 adjacent the openings 22 and also at the central portion 38. It will also be observed that the lines 36 at station 2 delineate one side of the handle extensions 20. At the leading end of the blank at station 2, the remainder of the handles 20 are die-cut. Also, the lines 34 and 35 which complete the cut between lines 36 and 38 are die-cut by the leading end of the die and which coincides substantially with the trailing end of the blank at station 3. The portions 37 of the steel rule cutting die form the openings 14 in the blank.

As hereinbefore stated, the steel rule die members disposed at station 2 effect partial cutting of the blank at this station, the cut being completed on the trailing edge of the blank disposed at station 3. The cut at the trailing end is completed after the strip has been moved a distance of five and three-quarters of an inch from station 2 to station 3. As herein shown, the blanks at stations 2 and 3 are held together by relatively small uncut portions along the steel rule cutting band, as indicated at 48, for the purpose of maintaining registration of the blanks with the cutting dies during successive cutting operations. These small uncut portions may be produced by making nicks in the steel rule cutting bands at the points 48 as indicated.

At station 3, the registration openings 22 are applied over pins 40 carried by intermittently movable chains 42 which run over sprockets 44 and 46, see FIGS. 5 and 6. The pins 40 carried by the chains are spaced apart longitudinally a predetermined distance, actually six inches in the illustrated embodiment, such distance being a short distance greater, that is one-quarter of an inch greater, than the distance between successive pairs of openings 22 as advanced by the intermittently operated feed rolls 26, 28. Thus, in operation, when the blank at station 3 engaged with the pins 40 is advanced to station 4, a distance of six inches, the blank at station 4 is separated from the blank at station 3 by tearing the same at the uncut portions 48.

From the description thus far, it will be seen that successive blanks cut from the strip 24 by the die-cutting operations occupy the full width of the web and that the handles 20 are formed in marginal portions of the web which would otherwise be waste material. It will be observed that the lines defining the outer ends of the handles are V-shaped and that one of said lines, 21, represents the marginal edge of the web 24. As illustrated in FIG. 4, a minimum of waste material is produced in accordance with the present method, the waste being indicated at opposed areas 50, 52, opposed areas 54, 56 and a central area 58 adjacent the trailing end which delineates the center of the cone in the assembled filtering device when the seam forming portions 60 and 62 are overlapped. The died-out openings 14 also produce waste material.

During the time that the blank 12, separated from the web 24, is at rest station at 4, the waste material which is retained in place by the relatively small uncut portions 48 are removed in any usual or preferred manner. In practice, vertically reciprocable upper and lower clamping units are arranged to grasp the waste sections to forcibly remove the same downwardly upon breaking or tearing the material at the uncut portions 48 of the blank whereupon the sections are released.

During the intermittent movement of the blank through various of the succeeding stations of operation, the blank may be printed with the name of the paint manufacturer or distributor, the printing roll being indicated diagrammatically at 64 and which is provided with a cooperating presser roll 66. Also, during such intermittent movement between subsequent stations, a coating of adhesive is applied to the side seam portion 60 and to the marginal edges of the openings 14 over which the gauze is subsequently applied. The adhesive applying roll is diagrammatically indicated at 70 and is also provided with a cooperating presser roll 72. It will be observed that the adhesive coated area for the side seam 60, as indicated at 74 in FIGS. 1 and 5, resembles a teardrop in shape, being relatively wide at the outer end thereof and tapering radially inwardly toward the cut out portion 76 which will subsequently form the center or point of the assembled cone. The coated area 74 represents the area of overlap of the marginal edges which affords more rigidity in the assembled cone, and more protection against the effects of paint or paint solvents which might destroy the adhesive seal. The extra width of the overlap portions along each marginal edge represents what formerly was waste material in the prior art paint strainers.

After the adhesive applying operation, a strip 78 of gauze withdrawn from a supply roll 80 thereof is cut to provide a substantially V-shaped section 16 of gauze for application over the openings 14. In practice, a gauze applying roller 82 provided with means for gripping and subsequently releasing the leading end of the gauze section 16 is intermittently rotated to advance the strip one section in length whereupon the section is severed and the roll continues to rotate to effect application of the gauze section over the openings 14 upon movement of the blank and rotation of the roll to adhesively secure the gauze to the marginal edges of the openings. A cooperating presser roll 83 may also be provided as shown. In practice, the strip 78 may be provided with spaced punched openings 85 corresponding to the width of the severed section so that the cutters, not shown, may operate with their ends in the cutout space without interference of the cutters one with the other.

It will be observed that the V-shaped gauze section 16 is formed from the full width of the supply roll 80 and that the marginal edges of the V-shaped section are substantially parallel to the marginal edges of the openings 14. Thus, it will be noted that successive gauze sections 16 cut from the strip 78 are wholly applied to the blank without producing any waste material. During intermittent movement of the gauze carrying blank through a following station of operation, upper and lower squeeze rolls 84, 86 serve to press the gauze into firm engagement with the adhesive. It will be understood that the presser rolls will be shaped to avoid interference with the adhesive applied to the side seam 68. From the description thus far it will be seen that successive blanks died out and separated from the strip are engaged by the pins 40 of the chain conveyer 42 and are intermittently moved in spaced relation through the various operating stations until they arrive at the final station of operation as shown in FIG. 6.

At the final station of operation along the chain conveyor 42, the blank is advanced beyond the conveyer to be straddled between suitable supports 88 and the blank is then removed from the pins 40. The blank thus supported free of the chains 42 and pins 40 is in position to be engaged by one of a plurality of cone forming mandrels 90 which are radially arranged about a center 91. In operation, the mandrels are intermittently rotated through several stations to engage the blank 12; to wrap the blank about the mandrel; to seal the side seam; and to remove the cones from successive mandrels to form a stack thereof.

As illustrated in FIGS. 7 and 8, each cone forming mandrel 90 is elongated at its upper end to provide flat triangular sides 92, 94 which taper down to a point 95, and curved end portions 96, 98 which also taper down to the point 95. The advantage of having an elongated and flat sided mandrel is that it is more convenient to shape the blank about the flat sides and to thereafter apply pressure to set the side seam against a flat surface than it would be if the folding, pressing and discharging elements had to conform to the conical shaped side. Also, the relatively narrow flat sided mandrels take up less space between stations of the radially arranged units. In practice, it was found that immediately upon removal of the filtering device from the forming mandrel it assumes a conical shape.

Figure 9:
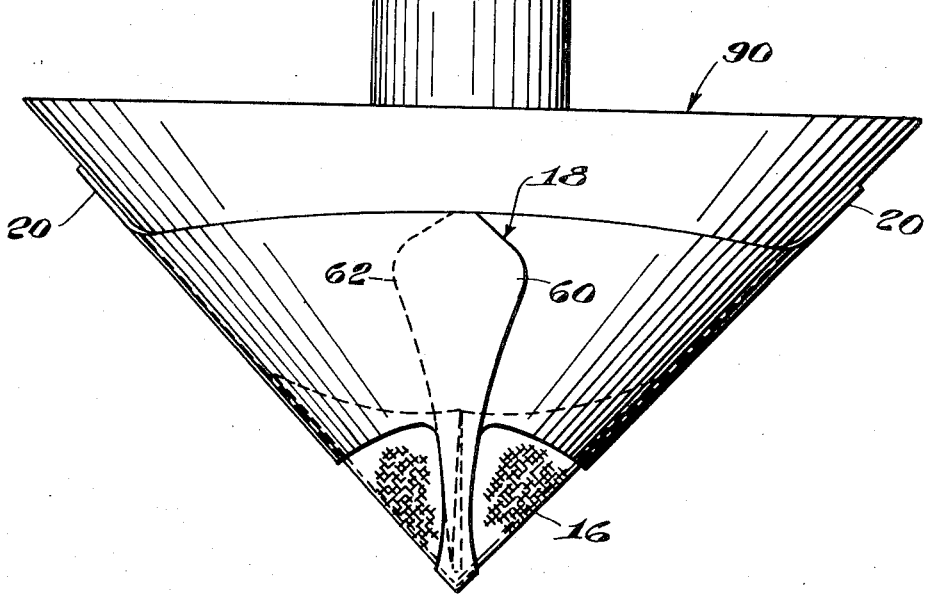
FIG. 9 is a view similar to FIG. 8 and illustrating the blank wrapped about the forming mandrel.

As herein illustrated, upon engagement of the elongated shaping mandrel 90 with the blank 12, as shown in FIG. 8, the blank is gripped along the forward marginal edge by grip fingers 100 carried by the mandrel. The mandrel is then moved through one station of operation, and during such intermittent movement, suitable mechanism, not shown, is provided for wrapping the sides of the blank about the mandrel to present the side seam portions 60, 62 in overlapping relation, as shown in FIG. 9, and for applying pressure to the seam to set the same. The pressure applying means, not shown, is maintained in engagement with the seam 18 throughout the next station of operation. The last operating station comprises the discharge station. After the pressure applying means is withdrawn and the grip fingers 100 are released, the cone is engaged by a longitudinally reciprocable suction member 102 arranged to strip the cone from the mandrel and to transfer the same onto a support 104 in nested relation to previously transferred conical filtering devices 10. In practice, provision is also made for counting the number of devices transferred to form a stack of a predetermined number thereof on the support 104 for convenience in packing the filtering devices.

In practice, the present paint strainer may be conveniently stored for use by supporting the same in stacked relation on a horizontal rod extending from a wall or other support, the rod being extended through one of the openings 22 of each strainer. Such paint strainer supporting rod may be placed under a bench or other protective place to keep the strainers free of dust or other foreign matter and also as a convenient storage space from which individual strainers may be easily removed.

From the above description, it will be seen that the present disposable filtering device and method of making same provides a novel and efficient structure of filtering device particularly adapted for straining paint whose structure provides increased rigidity and wherein the steps in the method of making the filtering device permit the same to be economically and rapidly produced.

While the preferred embodiment of the invention has been herein illustrated and described, it will be understood that the invention may be embodied in other forms within the scope of the following claims.

Having thus described the invention, what is claimed is:

1. The method of making a disposable cone shaped filtering device having gauze covered openings comprising the steps of intermittently advancing a web of sheet material of predetermined width a distance of one blank length each advancing movement, die-cutting successive blanks from the web while the web is at rest, each blank utilizing the full width of the web, said die-cutting operation leaving small uncut frangible portions between the leading and trailing ends of the blanks, the trailing end of one blank coinciding with the leading end of a succeeding blank, separating the leading blank from the web by breaking the frangible portions, applying and adhesively securing a section of gauze over the died-out openings, and wrapping the blank about a mandrel with the marginal edges in overlapping relation and adhesively securing the same.

2. The method as defined in claim 1 which includes the steps of applying adhesive to selected portions of successive blanks.

3. The method as defined in claim 1 which includes the steps of cutting successive sections of gauze from a strip thereof and applying the same over the openings, each section being defined by the full width of the strip, and the leading and trailing ends coinciding with each other whereby to eliminate waste of gauze material.

4. The method as defined in claim 1 wherein the died-out openings and marginal waste portions are also retained by small uncut frangible portions, and which includes the step of removing said waste portions by rupturing said frangible portions.

5. The method as defined in claim 1 wherein the mandrel for producing the cone shaped member is oval in plan and triangular in side elevation providing flat side walls against which the adhesive seam may be pressed, said cone shaped members assuming a conical shape upon removal from the mandrel.

6. The method as defined in claim 1 which includes the steps of removing the filtering devices from successive mandrels, and stacking the same in nesting relation.

7. The method of making a cone shaped filtering device having at least one opening therein comprising the steps of cutting successive blanks of sheet material from a web thereof by making successive arcuate cuts in the web whereby to form the convex trailing edge of one blank and the concave leading edge of the next successive blank, cutting openings in the blank, forming in the marginal edges of the blanks handles, each blank being the full width of the web, and cutting a blank of filtering material having openings therein and applying said blank of filtering material over said openings in the sheet material.

References Cited

UNITED STATES PATENTS

| | | | |
|---|---|---|---|
| 752,019 | 2/1904 | Adwen | 210—497 |
| 1,983,323 | 12/1934 | Stokes | 156—514 |
| 2,273,422 | 2/1942 | Schroeder | 210—497 |
| 3,049,121 | 8/1962 | Brumfield et al. | 55—521 |
| 3,156,597 | 11/1964 | Nadaline, Jr. | 156—514 |

DOUGLAS J. DRUMMOND, Primary Examiner

U.S. Cl. X.R.

156—265; 55—521; 210—497